Figure 1:
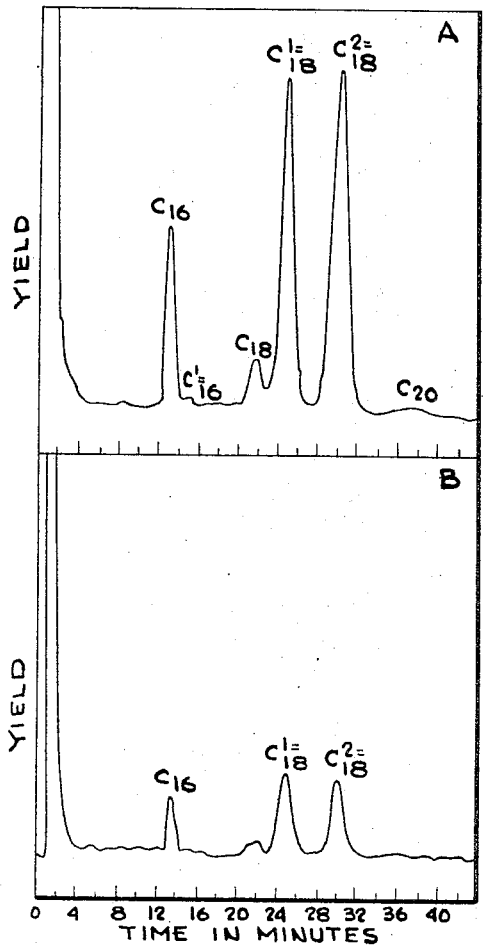

Jan. 23, 1968 K. ABEL ET AL 3,365,277

METHOD OF RAPID LIPID EXTRACTION

Filed Sept. 11, 1963

INVENTORS
KENNETH ABEL, JOHN I. PETERSON
& HANNIBAL S DE SCHMERTZING

BY Hurvitz & Rose

ATTORNEYS 3,365,277
METHOD OF RAPID LIPID EXTRACTION
Kenneth Abel, Vienna, Hannibal S. de Schmertzing, McLean, and John I. Peterson, Falls Church, Va., assignors to Melpar, Inc., Falls Church, Va., a corporation of Delaware
Filed Sept. 11, 1963, Ser. No. 308,141
12 Claims. (Cl. 23—230)

The invention relates to a novel method for the extraction of liquids from biological materials with simultaneous transesterification of the lipids to volatile esters, and to the analysis of the volatile esters by means of gas chromatography. The invention also concerns a novel method and apparatus for the transesterification of lipids with alcohols in the presence of boron trichloride as an alcoholysis catalyst.

Lipids form a class of naturally occurring substances which are glycerides of fatty acids. They are found in both animal and vegetable materials, and thus include fats, fatty oils, and waxes. Vegetable oils which may be thus classified include cottonseed, sesame, coconut and many others. Animal fats and oils include not only tallow, but more complex lipids such as lecithin, sterols, phospholipids.

Lipids are present in living organisms, and the study of lipid changes is of importance in biochemical and clinical investigations in bacteriology, public health, and the detection and tracing of the course of many diseases. Owing to the need for rapid determinations in such studies, and particularly in connection with gas chromatography studies of bacterial lipids, there has existed a need for a more convenient and more rapid method of forming the volatile esters of the lipid fatty acids than those presently available.

In accordance with the present invention, it has been found, surprisingly and unexpectedly, that the transesterification of lipids, from whatever source, may be carried out much more rapidly and smoothly using boron trichloride as an alcoholysis catalyst than with previously known acidic catalysts. Boron trichloride is particularly more active and rapid than boron trifluoride, which had been previously suggested for this purpose.

Transesterification of fatty substances by means of alcoholysis can be carried out in various ways, by reacting a lipid with an excess of an alcohol in the presence of an alcoholysis catalyst to produce glycerine and the esters of the alcohol with the fatty acids present. The alcohol displaces the glyceryl radicals in the fatty glycerides, forming glycerine and the fatty acid esters of the alcohol. The alcoholysis may be performed in presence of an alkaline catalyst, such as sodium or potassium hydroxide, sodium carbonate, lime, or pyridine, and the alkaline method is generally preferred as being faster. It has the disadvantages that metallic soaps may be formed, and that the alcohol must be anhydrous. Transesterification of lipids may also be carried out with acidic catalysts, such as sulfuric acid, hydrochloric acid, sulfonic acids, and boron trifluoride. Acid catalysts are, however, not always selective in their action, which may not be wholly catalytic, but may involve reaction with the alcohol itself. The known catalysts employed for this reaction have required from about one hour up to several days for completion of the alcoholysis, depending upon the catalyst and the lipid. In many instances the replacement reaction is adversely affected by water formation or other solvent competition. Among the acidic reagents, diazomethane, methanol-hydrochloric acid, and methanol boron combinations have been regarded in the art as the most suitable for rapid and quantitative conversion.

For analytical work it is especially necessary to avoid transesterification catalysts of the alkaline type, which involve complicated procedures for saponification and subsequent esterification of the fatty acids. Hence boron trifluoride has been heretofore regarded as offering the best route to direct and rapid esterification.

Two basic factors are involved in the election of an acidic catalyst for rapid transesterification. The effective acid strength of the catalyst is important, because the stronger acids convert more rapidly. Also a high concentration of the combining ionic entity, and the absence of strongly competing substituents, particularly water, aids the reaction rate as well as the shift of the equilibrium toward complete esterification. It might be assumed from these considerations that boron trifluoride is the best Lewis acid among the boron trihalides, because, from theoretical considerations, the strength of these compounds as electron acceptors, increases with decreasing atomic number of the halogen. The situation is actually more complex, however, and the superiority of boron trichloride, as an alcoholysis catalyst, as found in accordance with the invention, may be explained in the following way, although the applicants do not wish to be bound by any particular theory. Because of the high polarizability of the boron-chloride bonds, boron trichloride reactions do not stop at the formation of co-ordination complexes, as is the case with boron trifluoride, but progress to the formation of boron-organic compounds through ionic intermediates. In the case of reactions with methanol, for example, a complex forms immediately, and exothermally, followed by the postulated formation of methoxy-boron bonds to varying degrees, with release of hydrogen chloride. Alkyl chlorides can also be produced. Sufficient information is not available to outline definitively the mechanism of transesterification using boron trichloride. In any event, the greater reactivity of boron trichloride over boron trifluoride for this purpose can be explained in terms of its behaving effectively as a stronger acid, because of polarization with co-ordination, and also because boron trichloride will maintain the medium in an anhydrous state.

In carrying out the transesterification in accordance with the invention, there are preferably employed lower aliphatic alcohols, including aryl-substituted lower aliphatic alcohols. The alcohol which is preferred for the purposes of the invention is methanol. However, there may also be employed other lower aliphatic alcohols, and particularly monohydric alcohols, such as ethyl, propyl, isopropyl, normal-butyl, isobutyl, secondary-butyl, tertiary-butyl, amyl, and benzyl alcohols. Advantageously there is employed an amount of the alcohol at least about 50% in excess of the stoichiometric amount for alcoholysis of the lipid in question. Preferably, the proportion of alcohol to biological material being treated is maintained at about 100:1.

Boron trichloride $BCl_3$ boils at 12.5° C. and hence is a gas at room temperature. It provides nearly instantaneous esterification, the maximum time required being about 10 minutes, and usually only 1 to 2 minutes. The transesterification is practically quantitative and is reproducible. It requires a minimum of handling and of reagents, and can be adapted to automated systems.

The transesterification method of the invention can be applied to lipids from any source, and is especially adapted to the treatment of fatty materials of biological origin.

Lipids which may be treated in accordance with the method of the invention include, for example, fatty vegetable and animal oils, such as sesame oil, natural fats such as butter and tallow, lecithin, beeswax, and bacterial lipids.

A special aspect of the invention involves the development of a rapid procedure for the formation of volatile methyl esters from bacterial lipids for the study of bacterial composition by means of gas chromatography. Because of the dehydrating effect of boron trichloride and the solvent effect of this catalyst in methanol, wet bacteria may be treated directly in a combined extraction-transesterification procedure. Examples of typical bacteria which may be treated by the method of the invention include *Serratia marcescens*, *Gaffkya tetragena*, *Pasteurella tularensis*, *Escherichia coli*, *Bacillus anthracis* (spore form), *Bacillus globigei* (spore form), and *Micrococcus urea*.

The transesterification in accordance with the invention is carried out at atmospheric pressure, although elevated pressures may be employed, if desired. The addition of boron trichloride is carried out at room temperature, but the heat of the reaction is usually sufficient to start the alcohol boiling, and refluxing may be maintained by application of external heat. Hence the reaction temperature will generally be that of the boiling temperature of the alcohol.

In the transesterification of a fatty oil, the oil and a suitable quantity of the alcohol are placed in a reactor, and boron trichloride gas is passed into the reactor for a few minutes. The solution is added to water and the volatile alcohol esters extracted by a suitable solvent, such as diethyl ether.

For the chromatographic examination of the samples of esters obtained from the transesterification of fatty oils and of bacteria, in accordance with the invention, there was employed a gas chromatograph. An F & M Scientific Corporation linear programmed gas chromatograph, Model 500, equipped with a hot wire thermal conductivity detector was used. Two columns were used in this study: (1) a 7-foot by ¼ inch O.D. copper column filled with 10 percent SE 30 silicone rubber (General Electric) on Chromosorb Type W 100/120 mesh support, to which approximately 0.5 percent oleic acid was added to eliminate tailing; and (2) a 6-foot by ¼-inch O.D. copper column filled with 20 percent diethylene glycol succinate (F & M Scientific Corp.) on Chromosorb Type P 60/80 mesh support. The silicone rubber column was programmed from 125° C. to 300° C., with detector and flash heater operating at 225° and 300° C., respectively. The diethylene glycol succinate column was operated isothermally at 225° C. with detector and flash heater operating at 225° C. and 250° C., respectively. Hamilton microliter syringes were used to inject ether solutions of the methyl esters.

The following example, which is not to be regarded as limiting, illustrates the transesterification of a typical vegetable glyceride oil employing the method of the invention.

*Example 1.—Comparison of $BCl_3$ and $BF_3$ on lipids*

Sesame oil, U.S.P. grade, was employed as a typical glyceride oil. Of its total carboxylic acids, 8% was palmitic, 1% palmitoleic, 4% stearic, 45% oleic, 41% linoleic, and 1% arachidic.

A comparison was made of the relative effectiveness of $BCl_3$ gas and $BF_3$ gas in the transesterification of sesame oil. For this comparison, a 1.266 gram quantity of the sesame oil was weighed into a 10 ml. volumetric flask and made up to volume with diethyl ether. Equal portions were then transferred with a pipette into reaction flasks. Then 4 ml. of methanol was added and $BCl_3$ or $BF_3$ was passed into the solution for 4 minutes. One sample each of the $BCl_3$ and $BF_3$ treated solution was then allowed to remain at room temperature for 15 minutes. Each solution was then added to 50 ml. of distilled water and extracted twice with 5 ml. portions of diethyl ether. The ether fractions were dried over silica gel, and the volume condensed by passing dry nitrogen over the solution. The solution was then transferred to a 5-ml. graduated cylinder, the silica gel washed twice with ether, and the washings added to the bulk. Finally, the volume was adjusted to 5 ml. and then transferred to a 5 ml. rubber stoppered syringe vial. One sample each of the $BCl_3$ and $BF_3$ treated solutions was also refluxed for 15 minutes, following which they were treated in the same manner, for chromatographic examination.

In the accompanying drawings, FIGURE 1 shows the chromatograms obtained when equal portions of the samples used in comparing the effect of $BCl_3$ and $BF_3$ were injected into the gas chromatograph. Each chromatogram represents 0.51 mg. sesame oil. The column was 6-foot by ¼ inch O.D. copper containing 20% diethylene glycol succinate on type P Chromosorb, 60/80 mesh. The column was isothermal at 225° C. Helium carrier flow rate was 100 ml./min. Curve A shows yields of various esters obtained with treatment with $BCl_3$ 4 minutes, 15 minutes refluxing. Curve B shows the considerably lower yield obtained under the same conditions using $BF_3$.

In the transesterification of lipids occurring in biological materials, the general procedure is similar. A sample of the material to be treated, for example, bacteria, is first prepared in a finely divided state, such as single cells, or as homogenized or finely ground tissue. The sample does not have to be water-free, but should have excess liquid removed by some method such as centrifugation. The biological material is then suspended in a suitable alcohol, such as methanol, or a mixture of the alcohol and a non-interfering lipid solvent, such as diethyl ether. The proportion of alcohol to biological material should preferably be about 100:1 by weight. Boron trichloride is added, preferably as gas at the rate of 1 gram per 10 grams of alcohol. The heat of this reaction is sufficient to start the alcohol refluxing, and refluxing is maintained by external heating for 3 to 10 minutes depending upon the quantities of material involved. At this point extraction and transesterification are complete. Additional steps, such as extraction of the formed esters, may be taken, depending upon the method of analysis. In the gas chromatographic technique of the present invention, the boron-trichloride-alcohol-ester mixture, after removal of solid biological materials, can be analyzed directly without further treatment.

The following example illustrates the application of the novel method of the present invention to the direct extraction and transesterification of bacterial lipids.

Figure 2:
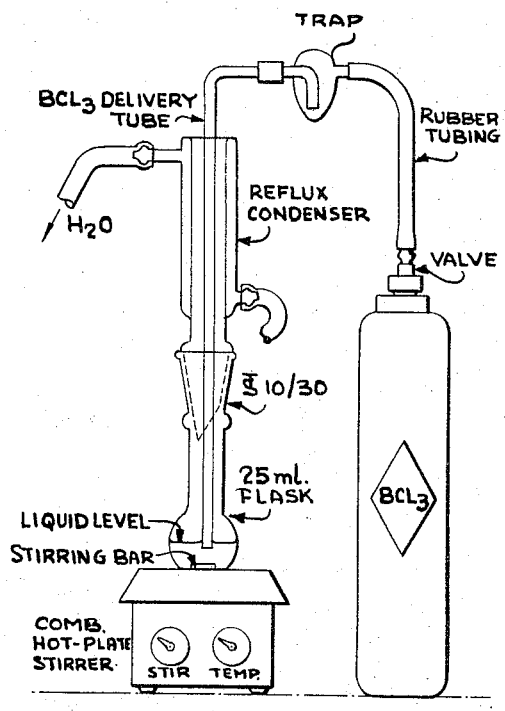

The apparatus employed for this purpose is illustrated in FIGURE 2 of the accompanying drawings.

*Example 2*

About 0.1 gram of dried bacteria *Serratia marcescens* was weighed and transferred to a 25 ml. volumetric flask, and 10 ml. methanol were added and a glass-covered magnetic stirrer was inserted. A reflux condenser was attached. The assembly was placed on a heated magnetic stirrer and the stirring rate adjusted to prevent localized overheating and to prevent the bacteria from settling. The boron trichloride gas delivery tube was inserted and gas added at a delivery rate of about 1 gram of $BCl_3$ in 2 minutes. The delivery tube tip was placed about 1 mm. below the surface of the suspension, although if the stirring is sufficiently vigorous, the tip may remain above the suspension during delivery of the gas. In about 1 minute refluxing began from the reaction of $BCl_3$ with the solution. The heated stirrer was then adjusted to maintain the required temperature for refluxing. At the end of 2 minutes, the $BCl_3$ delivery tube was removed from the solution and the gas shut off. The solution was refluxed for 5 minutes, and the flask contents transferred to a separatory funnel containing about 75 ml. of water. The methyl esters were extracted with a 10 ml. portion and two 5 ml. portions of diethyl ether, the volume of the ether adjusted, and a chosen aliquot analyzed by gas chromatography. The runs were repeated using refluxing times of 10 and 20 minutes respectively.

Figure 3:
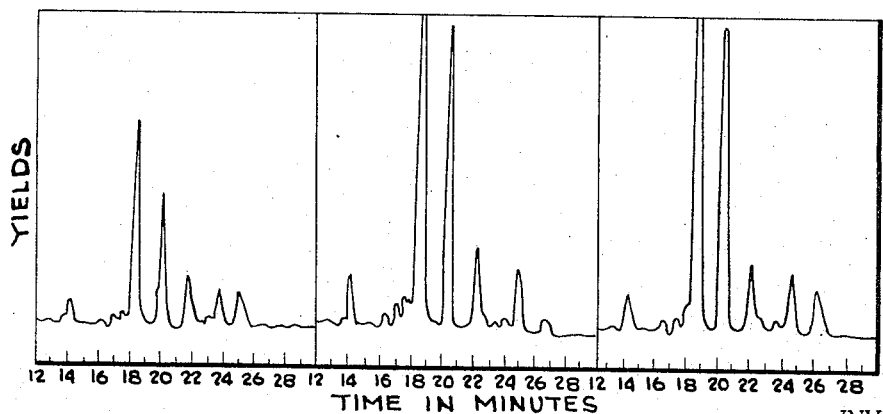

The results of the gas chromatography tests are shown in FIGURE 3 of the drawings. Each chromatogram represents 50 mg. of *S. marcescens*. The column was 7 foot by ¼" O.D. copper containing 10% SE 30 silicone rubber and 1% sebacic acid on type W Chromosorb, 100/120 mesh. Column temperature was programmed from 125° to 300° C. at 5.6° C./minute. Helium carrier flow rate was 100 ml./min. The first 12 minutes of each chromatogram are not shown.

Curve A represents the addition of $BCl_3$ gas to methanol, followed by 5 minutes refluxing, Curve B, 10 minutes refluxing, and Curve C, 20 minutes refluxing. It can be seen that the method is rapid, and that the addition of $BCl_3$ directly to a methanol suspension of the bacteria is fully effective to bring about conversion to the methyl esters of the lipid acids.

The apparatus as depicted in FIGURE 2 of the drawings has the various parts designated by name and function, and the operation thereof will be apparent to one skilled in the art from the description contained in Example 2.

The procedure described for treatment of bacteria has been found suitable for extraction and complete transesterification to separate the lipid acids as methyl esters. It is a convenient and rapid means of conducting studies of microbial composition.

What is claimed is:

1. Method for the extraction of lipids from lipid containing materials with simultaneous transesterification of the lipids into volatile alcohol esters of the lipid acids, which comprises treating the lipid containing material with an excess of an alcohol in the presence of an alcoholysis catalyst consisting essentially of boron trichloride, and recovering the volatile esters from the reaction mixture by extraction with a solvent.

2. The method of claim 1 in which the lipid containing material is a fatty oil.

3. The method of claim 1 in which the lipid containing materials are bacteria.

4. The method of claim 1 in which the alcohol is a lower aliphatic alcohol.

5. The method of claim 1 in which the alcohol is methanol.

6. The method of claim 1 in which the extraction and transesterification are carried out at about the boiling temperature of the alcohol.

7. The method of claim 1 in which the amount of the alcohol is at least about 50% in excess of the stoichiometric amount required for alcoholysis of the lipids present.

8. Method for the determination of the composition of bacterial lipids which comprises the steps of forming a suspension of the bacteria in a lower aliphatic alcohol, transesterifying the lipid acids present by heating said suspension in presence of an alcoholysis catalyst consisting essentially of boron trichloride, until volatile esters of the lipid acids are formed, extracting said volatile esters with a solvent to obtain an extract, and analyzing said extract by means of gas chromatography to determine the nature and amount of each lipid acid ester present therein.

9. The method of claim 8 in which the alcohol is methanol.

10. The method of claim 8 in which the boron trichloride is present in the form of a gas.

11. The method of claim 8 in which the extraction solvent is diethyl ether.

12. The method of claim 8 in which the proportion of the alcohol to the bacteria being treated is about 100:1, by weight.

References Cited

UNITED STATES PATENTS 2,910,515  10/1959  Luvisi et al. _____ 252—433 X
2,943,916  7/1960  McElroy _____ 23—205

OTHER REFERENCES

Metcalfe, L. D. and Schmitz, A. A., Anal. Chem. 33 (3), 363–364, March 1961.

Duron, O. S. and Nowotny, A., Anal. Chem. 35 (3), 370–372, March 1963.

Lappert, M. F., Chemical Reviews, October 1956, vol. 56, No. 5, pp. 1017–1018, 1024 relied on.

MORRIS O. WOLK, *Primary Examiner.*

R. M. REESE, *Assistant Examiner.*